United States Patent
May

(10) Patent No.: US 7,958,333 B2
(45) Date of Patent: Jun. 7, 2011

(54) PROCESSOR WITH MEMORY ACCESS STAGE ADAPTED TO FETCH AN INSTRUCTION OF A THREAD WHEN NO MEMORY ACCESS OPERATION IS DETECTED

(75) Inventor: Michael David May, Bristol (GB)

(73) Assignee: XMOS Ltd., London (GB)

( * ) Notice: Subject to any disclaimer, the term of this patent is extended or adjusted under 35 U.S.C. 154(b) by 544 days.

(21) Appl. No.: 11/755,119

(22) Filed: May 30, 2007

(65) Prior Publication Data

US 2008/0301409 A1   Dec. 4, 2008

(51) Int. Cl.
*G06F 9/30* (2006.01)
*G06F 9/40* (2006.01)
*G06F 13/00* (2006.01)
*G06F 13/28* (2006.01)
*G06F 3/00* (2006.01)

(52) U.S. Cl. ............................. 712/205; 711/100; 710/5

(58) Field of Classification Search ................... 712/205
See application file for complete search history.

(56) References Cited

U.S. PATENT DOCUMENTS

| 7,506,140 B2 * | 3/2009 | Jensen | 712/218 |
| 2004/0098496 A1 * | 5/2004 | Wolrich et al. | 709/230 |
| 2007/0143581 A1 * | 6/2007 | Mansell | 712/225 |

FOREIGN PATENT DOCUMENTS

| EP | 1499978 A | 1/2005 |
| EP | 1555610 A1 | 7/2005 |
| WO | 9522103 A | 8/1995 |

OTHER PUBLICATIONS

International Search Report dated Oct. 9, 2008.

* cited by examiner

*Primary Examiner* — Eddie P Chan
*Assistant Examiner* — William B Partridge
(74) *Attorney, Agent, or Firm* — Sughrue Mion, PLLC

(57) ABSTRACT

A processor and method for executing threads. The processor comprises multiple instruction buffers, each for buffering the instructions of a respective associated thread, and an instruction issue stage for issuing instructions from the instruction buffers to a memory access stage. The memory access stage includes logic adapted to detect whether a memory access operation is defined in each issued instruction, and to fetch another instruction if no memory access operation is detected.

31 Claims, 13 Drawing Sheets

PROCESSOR WITH MEMORY ACCESS STAGE ADAPTED TO FETCH AN INSTRUCTION OF A THREAD WHEN NO MEMORY ACCESS OPERATION IS DETECTED

FIELD OF THE INVENTION

This invention relates to scheduling multiple threads in a processor.

BACKGROUND OF THE INVENTION

Multiple thread processors are known. Each thread comprises a sequence of instructions generally directed to performing a particular self-contained operation or function particular to that thread. Threads can be executed in sequence or in parallel depending on the architecture of the processor, and can be scheduled or descheduled depending on the operations and functions that they are intended to achieve. Problems arise in multi-threaded processors, in particular that it is difficult to guarantee the performance of any particular thread.

In multi-threaded processes, it is either necessary to reserve processor cycles for each thread, even for threads which may have nothing to do, or to provide extra resources such as more memory access ports so as to make better use of reserved cycles. For example, in a conventional instruction fetch scheme there is a queue of instruction fetches and another queue of data accesses to the memory. If the instruction fetches are prioritised, a pipeline executing them may have to be stalled. If the data accesses are prioritised, an individual thread may be delayed by several cycles while waiting for its next instruction. In either case, the performance of a thread is unpredictably affected by other threads. This problem can be overcome by using dual ported memories (which are however expensive and power hungry), or having independent program and data memories (with the corresponding overhead).

In the past, multi-threaded processes have been used to hide delays in memory access, and so there has not been a real demand to improve real time performance of individual threads because that is not critical in that particular case.

One of the challenges facing processor designers is the handling of an ever-increasing number of external devices which wish to communicate with the processor. Generally this is done by providing some kind of interrupt handling capability for the processor for handling activity arising at ports connected to external devices. Increasingly, more sophisticated interface logic is used at these ports to deal with, for example, multiple external devices per port.

Interfacing is needed in a wide variety of different contexts. One context which is discussed herein by way of a background example is in mobile applications processing.

FIG. 1 shows an exemplary application of a mobile applications processor 2. The applications processor 2 comprises a CPU 4 and a plurality of interface controllers 6 which interface with a plurality of peripheral devices 8. The interface controllers include: a memory controller 6a for interfacing with a hard-drive (HDD) 8a and a SDRAM memory 8b; a video controller 6b for interfacing with a camera 8c; a display controller 6c for interfacing with an LCD display 8d; an audio controller 6d for interfacing with a microphone 8e, speaker 8f and headset 8g; and a connectivity controller 6e for interfacing with a keyboard 8h, a Universal Serial Bus (USB) device 8i, a Secure Digital (SD) card 8j, a Multi-Media Card (MMC) 8k, and a Universal Asynchronous Receiver/Transmitter (UART) device 8l. The interface controllers 6 are typically connected to the CPU 4 via a bus 3. The system also comprises a power controller 10 and radio processor 12.

Note that the interface controllers 6 are shown somewhat schematically, but represent generally some kind of dedicated I/O logic or specially configured ports.

Conventionally, external interfacing is achieved either using interrupts or by polling. When interrupts are used, an external peripheral device sends a signal to inform the processor either that it has data ready to input to the processor or that it requires data from the processor. When polling is used, the processor continually checks the state of the device to determine whether or not it is ready to supply or accept data.

One possibility for implementing an applications processor 2 such as that of FIG. 1 is to use an Application Specific Integrated Circuit microcontroller (ASIC). ASICs are hardwired devices possibly including microprocessors dedicated to a particular application and optimised to suit that application. For a given function, they are generally cheaper and consume less power than other options. However, they are complex to design, must be pre-designed and cannot readily be reconfigured.

Another possibility is to use Field Programmable Gate Array (FPGA) devices. FPGAs are semiconductor devices that can be configured "in the field" after manufacture. To configure an FPGA, first a computer is used to model the desired logical functions, for example by drawing a schematic diagram or creating a text file describing the functions. The FPGA comprises an array of look-up tables which communicate via statically configured interconnects. The computer model is compiled using software provided by the FPGA vendor, which creates a binary file that can be downloaded into the FPGA look-up tables. This allows manufacturers of equipment to tailor the FPGA to meet their own individual needs.

In this example, the interface controllers 6 are implemented as FPGAs. This has the benefit that the manufacturer of the mobile telephone can purchase generic FPGA devices 2 and then configure them on site (i.e. "in the field") to be specific to their desired application. The disadvantage of FPGAs however is that they are more expensive, slower and consume more power than ASICs.

In alternative examples, the whole chip 2 could be implemented in FPGA, or the chip 2 could be a general purpose processor with separate FPGA chips connected between the chip 2 and the respective peripherals 8. However, these options would be even more expensive and power-consuming—prohibitively so for most mobile phones and other consumer devices.

Some of the above difficulties can be overcome by using a multi-threaded processor where each thread is associated with a specific activity, in particular with input-output operations. Such a multi-threaded processor is described for example in our earlier U.S. application Ser. No. 11/717,623 filed 14 Mar. 2007 (our ref. 314563US/VRD), and is described more fully in the following. With such a multi-threaded processor, it is important that the performance of an individual thread can be guaranteed. Potential problems arise if, for example, all of the threads require memory accesses for data or instruction fetches at the same time, or if several input-output operations arise simultaneously. In such situations, one thread may be delayed waiting for all of the other threads to complete their accesses, or an input-output request to activate a thread may be delayed until the requests to activate all the other threads have been processed.

One way to avoid this problem is to construct a computer architecture with sufficient resources to ensure that every thread can always progress, but this would be prohibitively expensive and would be a highly redundant design.

SUMMARY OF THE INVENTION

According to one aspect of the invention, there is provided a processor for executing threads, each thread comprising a sequence of instructions, said instructions defining operations and at least some of said instructions defining a memory access operation, comprising: a plurality of instruction buffers, each for holding at least one instruction of a thread associated with that buffer; an instruction issue stage for issuing instructions from the instruction buffers; a memory access stage connected to a memory and arranged to receive instructions issued by the instruction issue stage; said memory access stage comprising: detecting logic adapted to detect whether a memory access operation is defined in each issued instruction; and instruction fetch logic adapted to instigate an instruction fetch to fetch an instruction of a thread when no memory access operation is detected.

The process can include a thread scheduler arranged to schedule multiple threads for execution based on indications of specific activities associated with the threads.

The thread scheduler may be arranged to transmit, upon suspending a thread, a continuation point vector to a vector register associated with a port; and the continuation point vector may be returned in dependence on an activity at the port. A continuation point vector identifies a point in the sequence where execution of the thread should be continued upon occurrence of the respective activity. This may advantageously allow additional responsibility for the thread to be transferred to the port, and may free up instruction buffers which need not be kept filled with pending instructions.

Further, the use of continuation point vectors may allow multiple activities (or events) to be handled per thread.

The instruction unit can be arranged to issue a fetch instruction request in the event that the instruction buffer of a thread for which an instruction should next be issued is empty for the reason that the thread awaits a vector from a resource, wherein the fetch vector request fetches the vector from the resource and instigates a memory access operation at the memory access stage using the vector to provide an address.

The processor may comprise a plurality of sets of thread registers, each set of thread registers being allocated to store information relating to a respective one of said multiple threads. The processor may comprise at least one channel between at least two of said sets, and the thread scheduler may be adapted to schedule a thread based on activity occurring over said channel.

The processor may be implemented on a chip.

The execution unit may be adapted to recognise and execute dedicated instructions for suspending and running threads.

The thread scheduler may be further adapted to schedule a thread based on an interrupt.

The thread scheduler may be adapted to schedule a thread without suspension if an associated activity occurs on or before execution of an instruction within that thread which is dependent on that activity.

According to another aspect of the invention, there is provided a mobile terminal having a mobile applications processor, at least one peripheral device, and an interface processor connected between the mobile applications processor and the peripheral device, the interface processor being a processor as defined hereinabove.

According to another aspect of the invention, there is provided an array of interconnected processors, at least one of said processors as defined hereinabove.

Another aspect of the invention provides a method of executing threads, each thread comprising a sequence of instructions, said instructions defining operations and at least some of said instructions defining a memory access operation, the method comprising: holding at least one instruction of a thread in an instruction buffer for that thread; issuing instructions from the instruction buffers to an instruction issue stage of an execution pipeline; receiving instructions issued by the instruction issue stage at a memory access stage connected to a memory; detecting whether a memory access operation is defined in the instruction and, when it is not, instigating an instruction fetch operation to fetch an instruction of a thread.

It will be appreciated that instigation of an instruction fetch operation may not complete an instruction fetch operation. For example, if all the instruction buffers for all threads are already full, no instruction will be fetched as a result of instigation of the instruction fetch operation.

A memory access operation defined in an instruction can be of different types. For example, a load instruction defines a memory access operation which retrieves data from the memory. A store instruction defines a memory access operation which loads data into the memory. A first type of branch instruction defines a memory access operation which causes an instruction to be fetched from memory at a target address supplied in the branch instruction.

A second type of branch operation defines a memory access operation which retrieves a target from the memory based on an address in the branch instruction. It will be appreciated that for this type of branch instruction, the instruction itself which is located at the target will be fetched in a subsequent instruction fetch operation.

For a better understanding of the present invention and to show how the same may be carried into effect, reference will now be made, by way of example, to the corresponding drawings.

DETAILED DESCRIPTION OF THE DRAWINGS

DETAILED DESCRIPTION OF THE PREFERRED EMBODIMENTS

Figure 1:
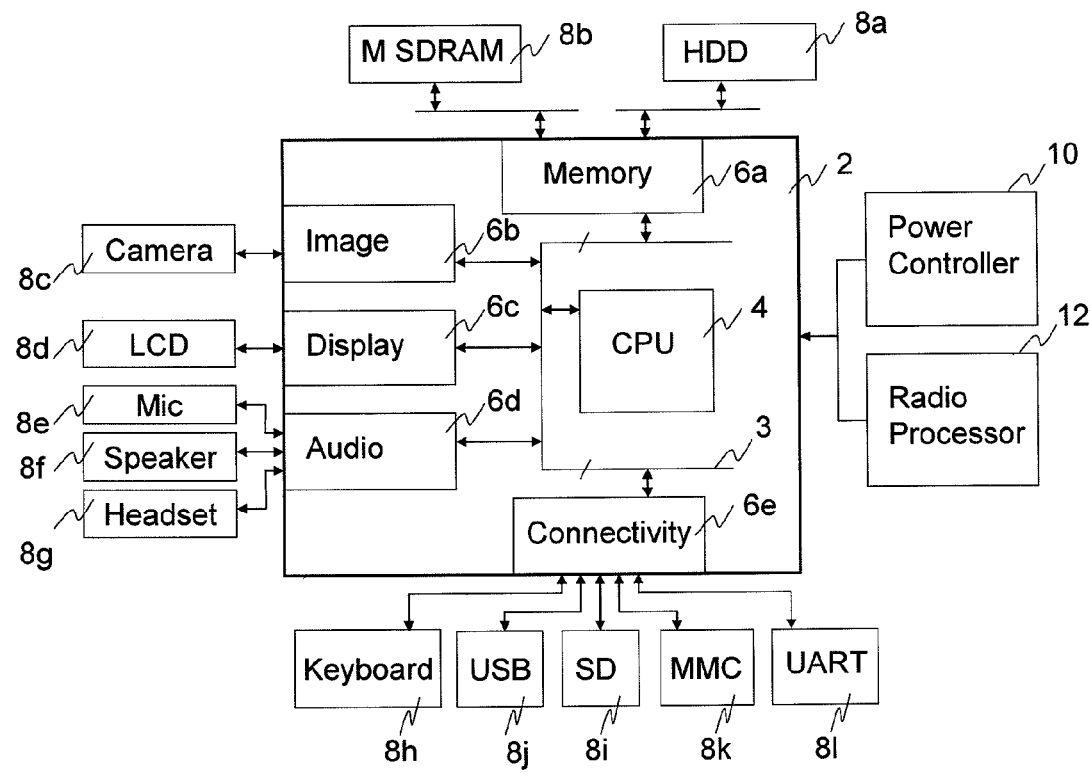
FIG. 1 illustrates an example application of an FPGA device as is known in the art.
Figure 2:
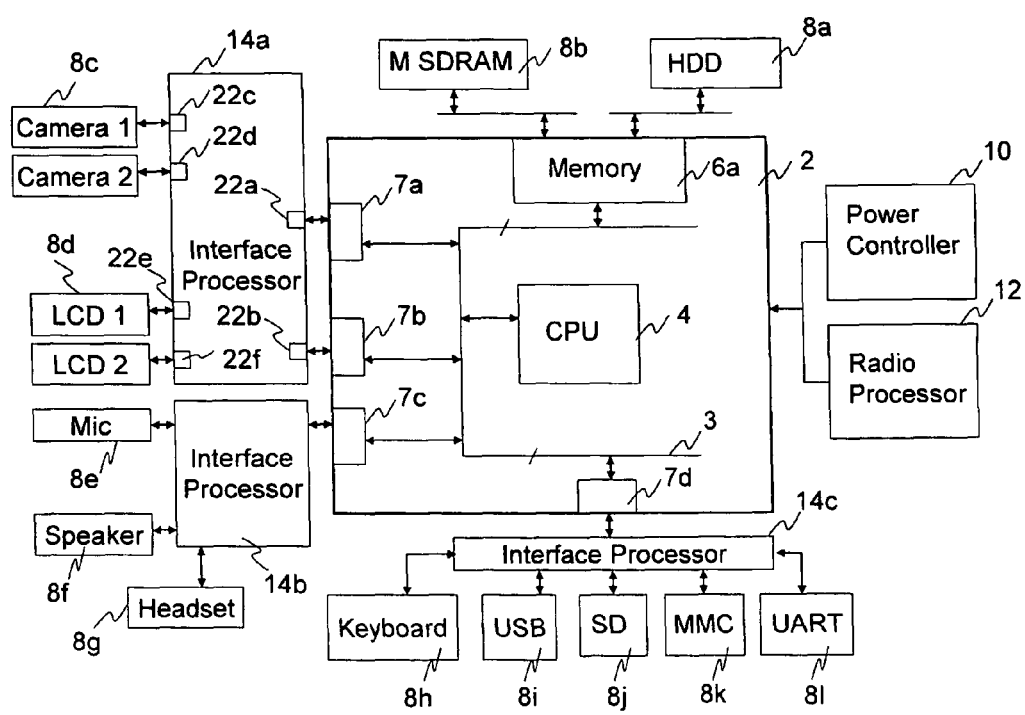
FIG. 2 illustrates an example application of an interface processor.

FIG. 2 shows an exemplary application of interface processors in a mobile telephone. The mobile applications processor 2 needs to communicate with the plurality of peripheral devices 8. As in FIG. 1, the applications processor 2 comprises a bus 3, a CPU 4, and a memory controller 6a for interfacing with a hard-drive (HDD) 8a and a SDRAM memory 8b, as well as a power controller 10 and radio processor 12.

However, in place of dedicated controllers 6, the arrangement of FIG. 2 allows the CPU 4 to communicate externally via generic ports 7. In this example, generic ports 7a and 7b are provided for interfacing with cameras 8c and LCD displays 8d; a generic port 7c is provided for interfacing with a microphone 8e, speaker 8f and headset 8g; and a generic port 7d is provided for interfacing with a keyboard 8h, a Universal Serial Bus (USB) device 8i, a Secure Digital (SD) card 8j, an Multi-Media Card (MMC) 8k, and a Universal Asynchronous Receiver/Transmitter (UART) device 8l.

In FIG. 2, interface processors 14a, 14b and 14c are placed at the outputs of the relevant ports 7, with a first interface processor 14a being connected between the image devices 8c-8d and the generic ports 7a-7b, a second interface processor 14b being connected between the audio devices 8e-8g, and a third interface processor 14b being connected between the generic port 7d and the various connectivity devices 8h-8m. The ports 7 need only be general purpose ports because the application-specific display, audio and connectivity functions are implemented by the interface processors 14a-14c in a manner to be described later. The ports 7 need not use FPGA logic, because the interface processors 14 provide the flexibility and configurability that would otherwise be provided by FPGAs. The interface processor 14a has ports 22a and 22b connected to the ports 7a and 7b, and ports 22c, 22d, 22e and 22f connected to the external devices 8c and 8g. The interface processors 14b and 14c have similar ports, not shown in FIG. 2.

The interface processors are typically involved in implementing the specific protocols used to transfer data via the interfaces, re-formatting data including converting it between parallel and serial formats, and possibly higher level functions such as encoding it, compressing it or encrypting it.

Figure 2A:
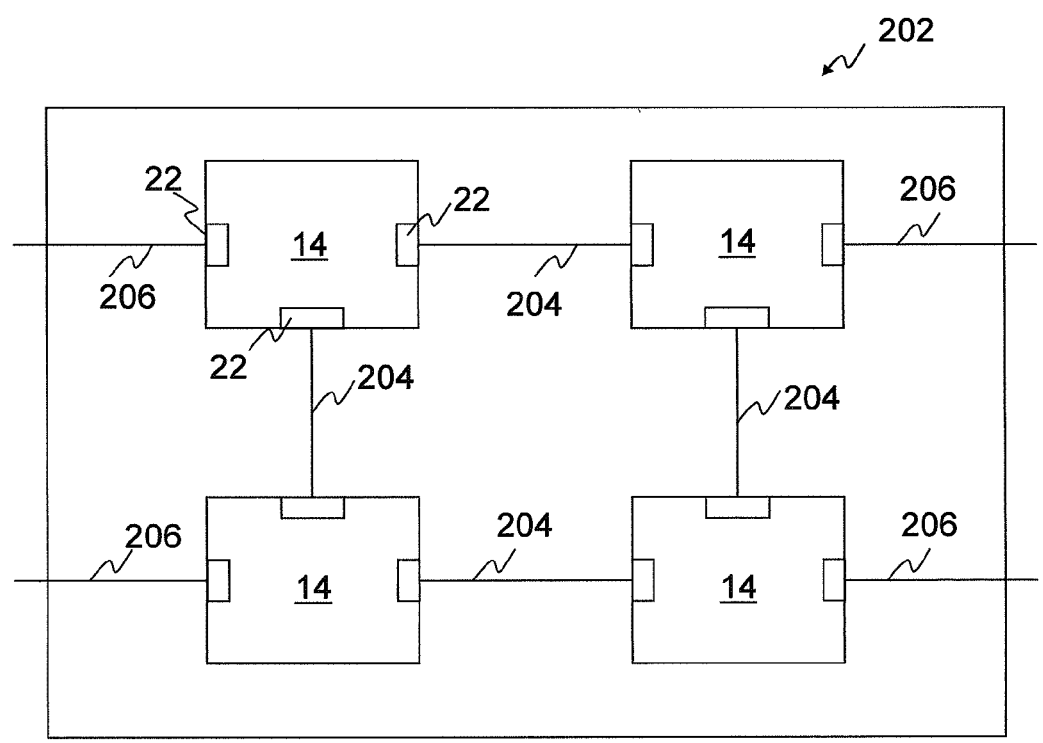
FIG. 2A illustrates another example application of an interface processor.

Another application of an interface processor is as a tile in a multiprocessor chip 202 illustrated in FIG. 2a. Such a chip 202 uses a high performance interconnect 204 which supports communication between the processors 14 on the chip 202, and inter-chip links 206 so that systems can easily be constructed from multiple chips. Each processor 14 is connected to its inter-chip link 206 and high performance interconnects 204 via ports 22.

An important feature of the interface processor which is discussed more fully in the following is its ability to manage activity at the ports 22. Each interface processor comprises a CPU, memory and communications. To allow the direct and responsive connectivity between the CPU and the ports, each processor has hardware support for executing a number of concurrent program threads, each comprising a sequence of instructions, and at least some of which are specifically responsible for handling activity at the ports. As will be discussed more fully in the following, the hardware support includes:
 a set of registers for each thread,
 a thread scheduler which dynamically selects which thread to execute,
 a set of ports used for input and output (ports 22),
 The use of a small set of threads on each processor can be used to allow communications or input/output to progress together with other pending tasks handled by the processor, and to allow latency hiding in the interconnect by allowing some threads to continue whilst others are suspended pending communication to or from remote interface processors.

In accordance with an embodiment of the present invention, thread instructions are issued in such a way as to allow any number of threads to share a common memory system and input-output system, while guaranteeing that with n threads able to execute, each will get at least 1/n processor cycles. Threads able to execute include threads with their registers etc allocated/in use, including running, pause and temporarily descheduled threads. In fact, it is useful to think of one thread cycle as being n processor cycles.

From a software design standpoint, this means that the minimum performance of a thread can be calculated by counting the number of concurrent threads at a specific point in the program. In practice, performance will almost always be higher than this because individual threads will sometimes be delayed waiting for input or output and their unused processor cycles taken by other threads. Further, the time taken to restart a waiting thread is always at most one thread cycle. The set of n threads can therefore be thought of as a set of virtual processors, each with clock rate at least 1/n of the clock rate of the processor itself. The only exception to this is that if the number of threads is less than the number of pipeline stages p, the clock rate of a virtual thread is at most 1/p.

Figure 3:
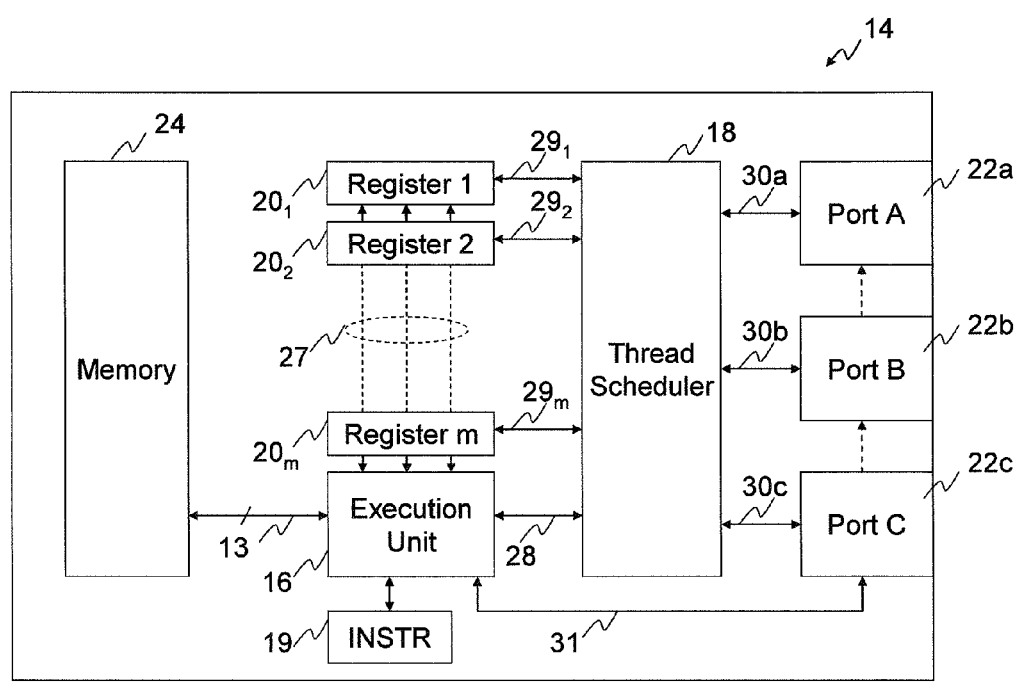
FIG. 3 is a schematic representation of the architecture of an interface processor.

FIG. 3 shows schematically an exemplary architecture of an interface processor 14 according to one embodiment of the present invention. The processor 14 comprises an execution unit 16 for executing threads of instructions under the control of a thread scheduler 18. The processor 14 further comprises a Random Access Memory (RAM) 24 for holding program code and other data, and a Read Only Memory (ROM) (not shown) for storing permanent information such as boot code.

The thread scheduler 18 dynamically selects which thread the execution unit 16 should execute. Conventionally, the function of a thread scheduler would simply be to schedule threads from the program memory in order to keep the processor fully occupied. However, according to the present invention, the scheduling by the thread scheduler 18 is also related to activity at the ports 22. It is noted in this respect that the thread scheduler may be directly coupled to the ports 22 so as to minimise the delay when a thread becomes runnable as a result of an input or output activity at the port.

Each of the m threads under consideration by the thread scheduler 18 is represented by a respective set of thread registers $20_1 \ldots 20_m$ in a bank of registers 20, to which the thread scheduler 18 has access. Instruction buffers (INSTR) 19 are also provided for temporarily holding instructions fetched from memory 24 before being subsequently issued into the execution unit 16. The execution unit has access to each of the registers 20 and buffers 19. Instructions are fetched from program memory 24 under control of the thread scheduler 18 and placed temporarily in the instruction buffers 19. The details of these registers and buffers are discussed later.

Of the m threads, the thread scheduler 18 maintains a set of n runnable threads, the set being termed "run", from which it issues instructions in turn for execution, preferably in a round-robin manner. Runnable threads are selected from a group of allocated threads. When a thread is unable to continue it is suspended by removing it from the run set, but remains in the allocated set. The reason for this may be, for example, because the thread is awaiting one or more of the following types of activity:
 its registers are being initialised prior to it being able to run,
 it has attempted an input from a port which is not ready or has no data available, it has attempted an output to port which is not ready or has no room for the data, it has executed an instruction causing it to wait for one or more events which may be generated when ports become ready for input.

In the following description, instructions are fetched from runnable threads in a round-robin manner, but it is possible to fetch instructions from all allocated threads in a round-robin manner in some embodiments.

Note that the term "event" as used herein refers to a particular type of operation, which is slightly different from basic input-output operation. The distinction is discussed below in relation to FIGS. 4 and 5.

Figure 3A:
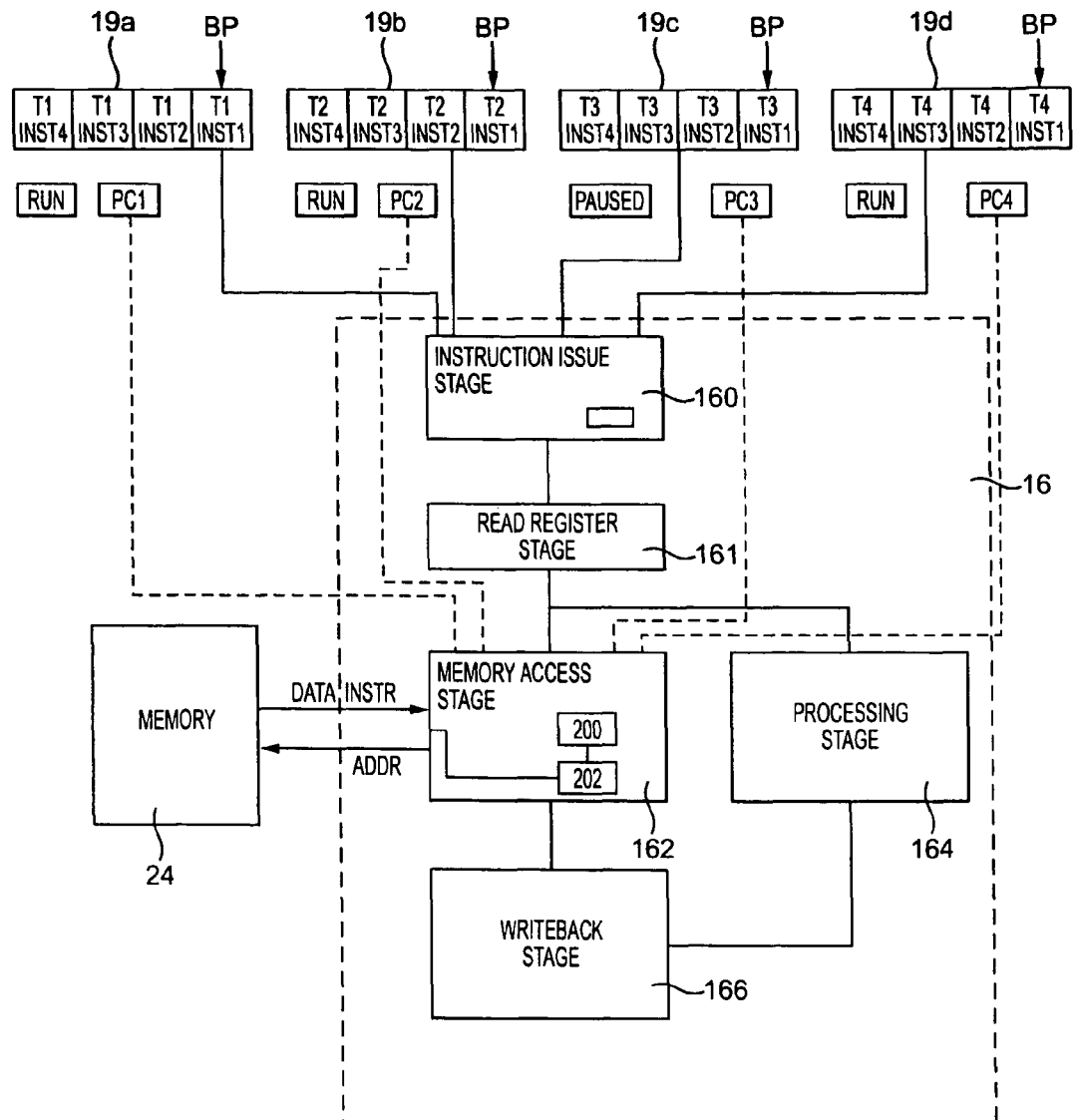
FIG. 3A illustrates the components within the execution unit 16 which handle the thread instruction issue and execution.

Advantageously, in order to facilitate rapid reaction time, a direct hardwired connection 28 is provided between the thread scheduler 18 and the execution unit 16 to allow the thread scheduler 18 to control which thread or threads the execution unit 16 should fetch and execute. Reference will now be made to FIGS. 3A to 3D to describe the manner in which thread instructions are issued in more detail. FIG. 3A illustrates the components within the execution unit 16 which handle the thread instruction issue and execution. Note that the diagram is schematic only and is intended to illustrate operation of the system by way of functional blocks. The execution unit 16 comprises a pipeline including an instruction issue stage 160 which issues instructions held in the buffers 19. The pipeline further includes a read register 161, a memory access stage 162, a processing stage 164 and a writeback stage 166. The read register stage and writeback stage are connected to the register 20, but this is not shown in FIGS. 3A to 3D.

As illustrated in FIG. 3A, there is a separate buffer 19a to 19d for each thread. In the described embodiment, each buffer 19a ... 19d is 64 bits long and is able to hold either four short instructions or two long instructions. In FIG. 3A, each buffer is shown holding four short instructions. These are labelled according to the protocol TiINSTj, where i denotes the number of the thread and j denotes the number of the instruction within that thread. That is, T1INST1 denotes the first instruction of thread 1. Instructions are issued from the buffers 19a ... 19d for runnable threads in a round-robin manner, ignoring threads which are not in use or are paused. This is shown diagrammatically in FIG. 3A, where threads T1,T2 and T4 are in a run state, but T3 is in a paused state. The thread status is discussed in more detail later. The instruction issue stage 160 is responsible for issuing instructions to a read register stage 161 of the pipeline. The read register stage is connected to a memory access stage 162 and to a processing stage 164. Instructions are of a number of different types. A first type are data access instructions, which are instructions such as load/store intended to transfer data to and from the memory 24. A second type are branch instructions. These come in two styles. A first style defines a memory access operation which fetches an instruction from the memory at a target address defined in the branch instruction. A second style identifies a location in memory at which a branch target address is located, and loads the program counter (PC) with the target address. A third type are computational instructions which instruct the operation of processing stage 164 in the execution unit based on their opcodes. In a conventional processor, the only type of instructions which would normally be forwarded to a memory access stage of an execution pipeline are data access instructions.

According to the described implementation of the present invention herein, all types of instructions have an effect at the memory access stage, regardless of the operation defined in the instruction itself, e.g. by the opcode. The first type of instruction accesses data, as usual. Both the second and third type of instructions cause an instruction to be fetched from the memory 24. The first style of branch instructions fetch their branch target instructions during the memory access stage. The second style use the memory access stage to access the target address. In that case, the branch target instruction itself would be fetched by a fetch no-op (discussed later) or during the memory access staged of another thread which doesn't need to use its memory access stage.

Any other instruction uses the memory access stage to perform an instruction fetch, in addition to implementing its defined operation in the processing stage 164. That is, it dispatches an address to the memory 24 which returns an instruction which is used to load the buffers 19a ... 19d. The instruction which is fetched loads the thread's own instruction buffer unless this is full, in which case it is used to load the buffer of another thread. As described later, each thread maintains a program counter value (PC1, PC2 etc shown in FIG. 3A) indicating at what point in the instruction sequence the thread is.

For this purpose the memory access stage includes detecting logic 200 which is arranged to detect the opcode of the instruction to determine whether or not a memory access operation is defined in it. In addition, the memory access stage includes instruction fetch logic 202 which is adapted to instigate an instruction fetch to fetch an instruction of a thread when no memory access operation is detected by the detecting logic 200.

The PC is issued with the instruction to the memory access stage and is used to determine the address to be used for the memory access. Where the thread's own buffer is full, the instruction unit detects that condition and in that case passes the PC of another thread to the memory access stage to determine the address to be used for the memory access. When a thread performs an instruction fetch on behalf of another thread, the thread is selected from the runnable threads. The thread chosen will be the next but one thread in the round-robin sequence to issue which has an empty buffer. If none of them has an empty buffer, it will be the next but one to issue which has a non-full buffer.

It will be appreciated that the precise details of which thread is chosen depends on the specific implementation. For example, the next thread could be drawn from another round robin group of threads waiting for fetches. An instruction also could be fetched for a paused thread where the next instruction or sequence of instructions following the pause is known, although an instruction preferably would not be fetched for a thread suspended awaiting multiple events (see below) because the thread could branch to different instructions depending on which event occurs first.

If an instruction buffer is empty when an instruction should be issued from it (as detected by the instruction issue stage 160), a special "fetch no-op" request is issued. This uses the memory access stage to load the issuing thread's instruction buffer.

Figure 3B:
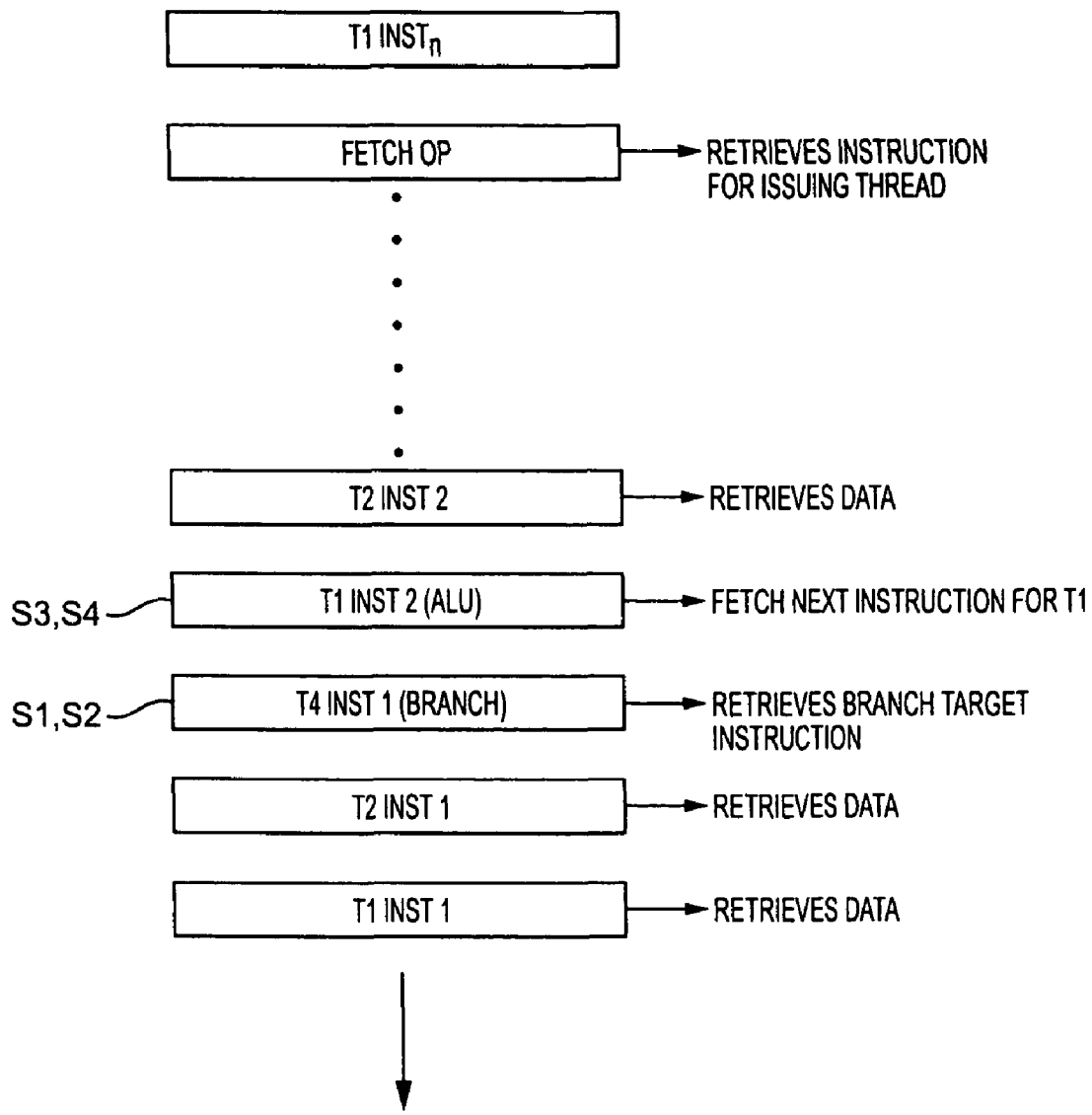
FIG. 3B shows a sequence of instructions.
Figure 3C:
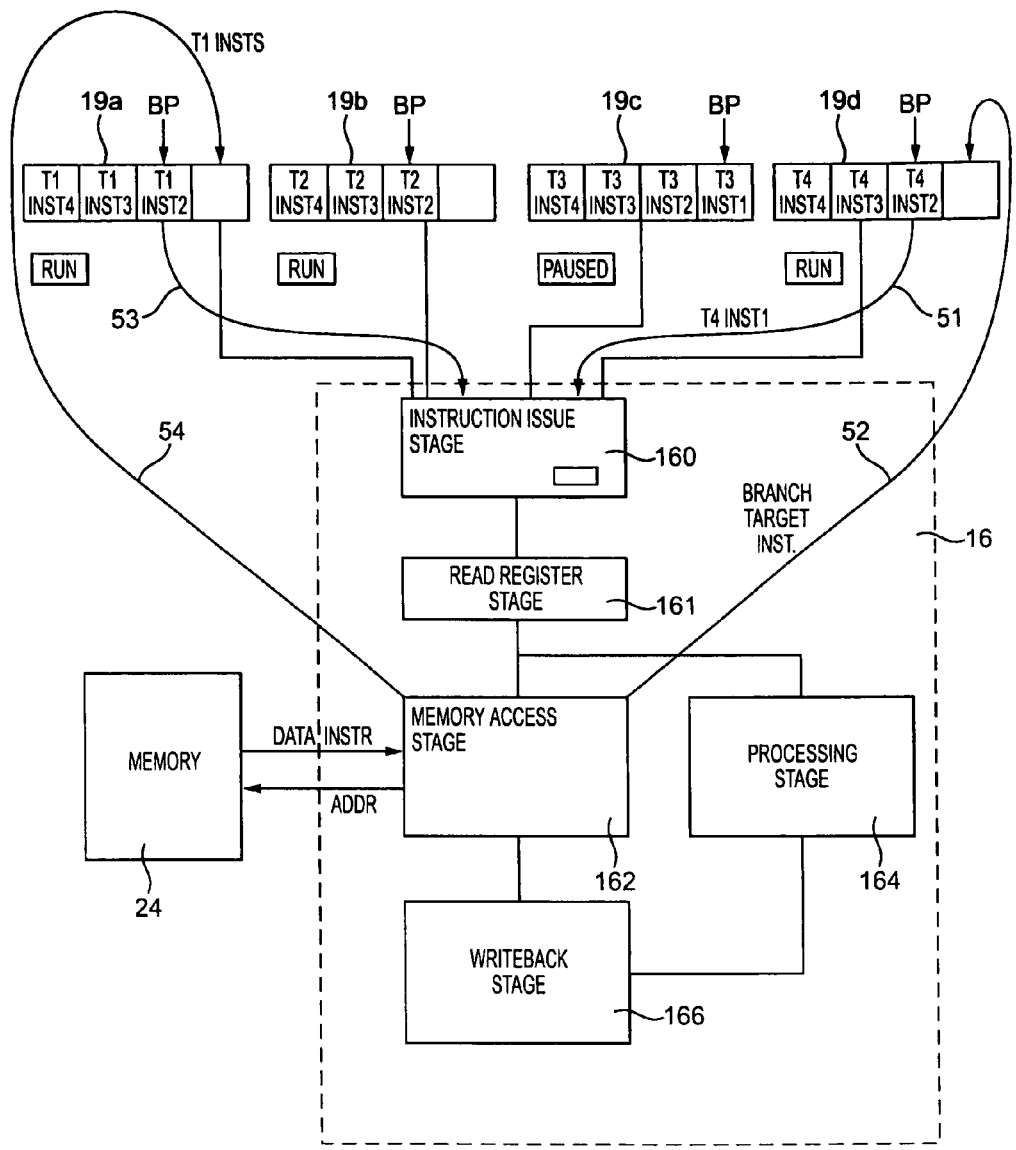
FIG. 3C illustrates an example of instruction issue.

FIG. 3B shows the sequence in more detail. The downward arrow in FIG. 3B denotes the direction in which instructions are being issued into the memory access stage from the instruction issue unit 160. The "round-robin" causes T1INST1 to be issued first, then T2INST1, then T4INST1 etc. Note that nothing is issued from T3 because that thread is not runnable.

It is assumed for the purposes of illustration that T1INST1 and T2INST2 are data access instructions, each of which retrieve data at the memory access stage. T4INST1 is a "first style" branch instruction, and instead of retrieving data this retrieves an instruction located at the branch target. In FIG.

3C, step S1 illustrates the fetch of T4INST1 by the instruction issue unit. Step S2 illustrates the memory access stage accessing a branch target instruction and loading this into the buffer of T4 (into its empty slot). Each buffer has a buffer pointer BP which moves such that the buffer acts as a first in-first out buffer.

The next instruction to be issued after T4INST1 according to the round-robin scheduling is T1INST2 (fetched in step 53), which is denoted as an ALU instruction, that is one which would not normally use the memory access stage. In the embodiment of the invention however, in addition to instructing the processing stage to perform an ALU operation, it pauses the memory access stage to initiate a fetch of the next instruction for thread T1 as denoted in step S4 in FIG. 3C. This instruction (labelled T1INST5) is loaded into the empty slot in buffer 19a associated with thread T1.

Figure 3D:
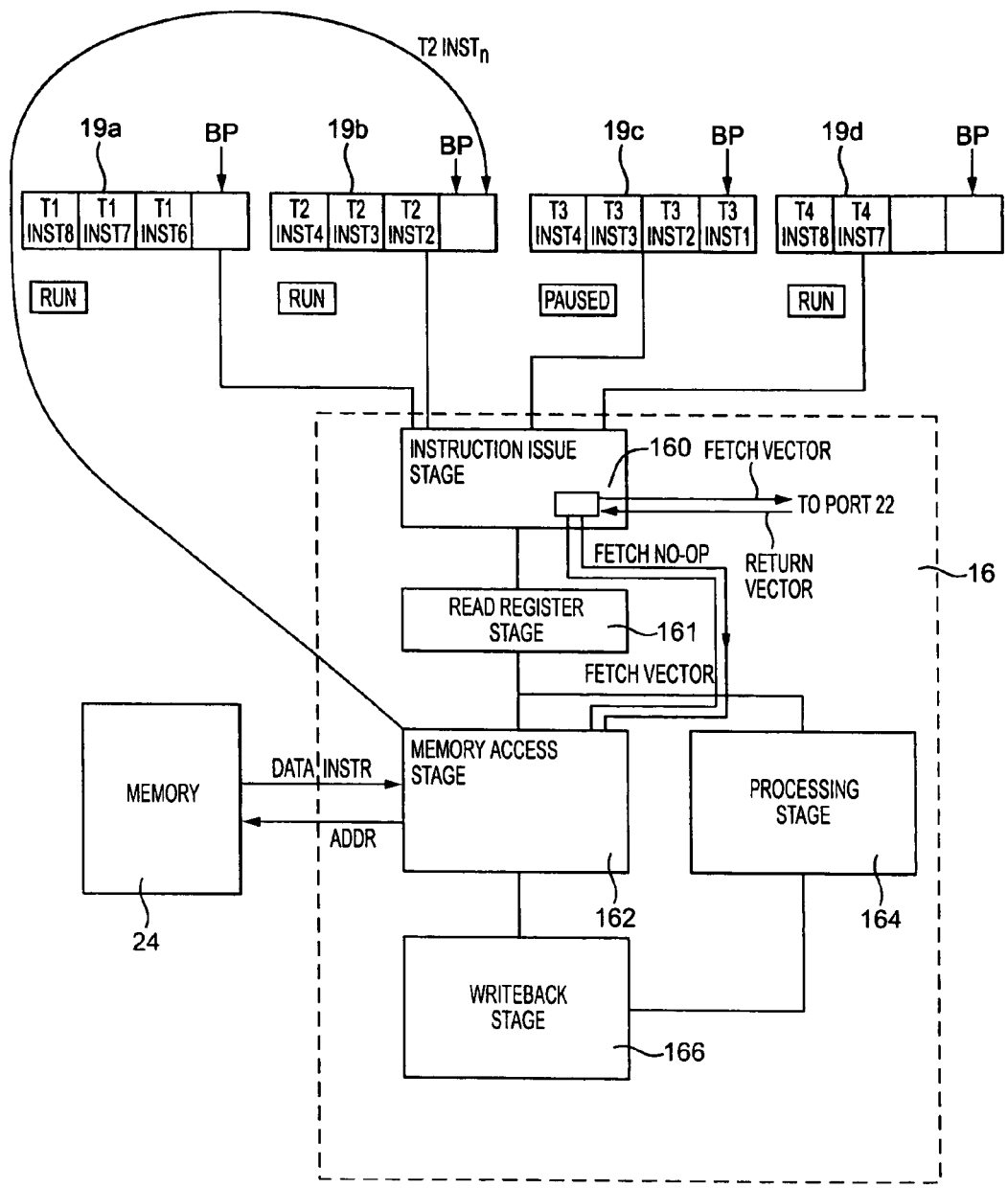
FIG. 3D illustrates another example of instruction issue.

Instructions carry on to be issued and handled in this way. It is possible that a situation illustrated in FIG. 3D is reached, where the buffer associated with the thread that would next issue (in this case T2) is empty but the instruction issue unit is waiting to issue an instruction. In that case, the "fetch no-op" request is issued to the memory access stage which fetches the next instruction for the thread which would otherwise have been issued. In the example, it is assumed that this thread was T1, and that it is now at its nth instruction. The address is determined by the PC for the last issued instruction for that thread. To be more precise, if the buffer is empty, the PC is the fetch address. If the buffer is partly full, the fetch address is calculated by adding the number of instructions in the buffer to the PC. It is possible to maintain in the processor a fetch address and a PC.

There are very few situations in which a "fetch no-op" is needed, and these can often be avoided by simple instruction scheduling in compilers or assemblers.

As is discussed in more depth later, certain instructions cause threads to become non-runnable because, for example, an input port has no available data. When the data becomes available, the thread will continue from the point which it paused. An instruction must be issued rapidly in order to support a high rate of input and output. To achieve this, a ready bit or flag 37 is provided at a port 22 (as discussed in more detail later with reference to FIG. 4). Upon detection of the ready flag 37, the thread is restarted, normally by re-entering it into the round-robin sequence and reissuing the input instruction. This may result in a response time which is longer than the virtual cycle time because of the time for the reissue instruction to pass through the execution pipeline.

Ideally, the virtual processor should be able to perform input and output operations at one per virtual cycle rate. In embodiments, this can be achieve by providing a "fast mode" in each port. When an input or output instruction detects that a port in fast mode is not ready, it replaces the thread's next instruction and causes the next instruction to be reissued until the port becomes ready and the input instruction can complete.

Figure 6:
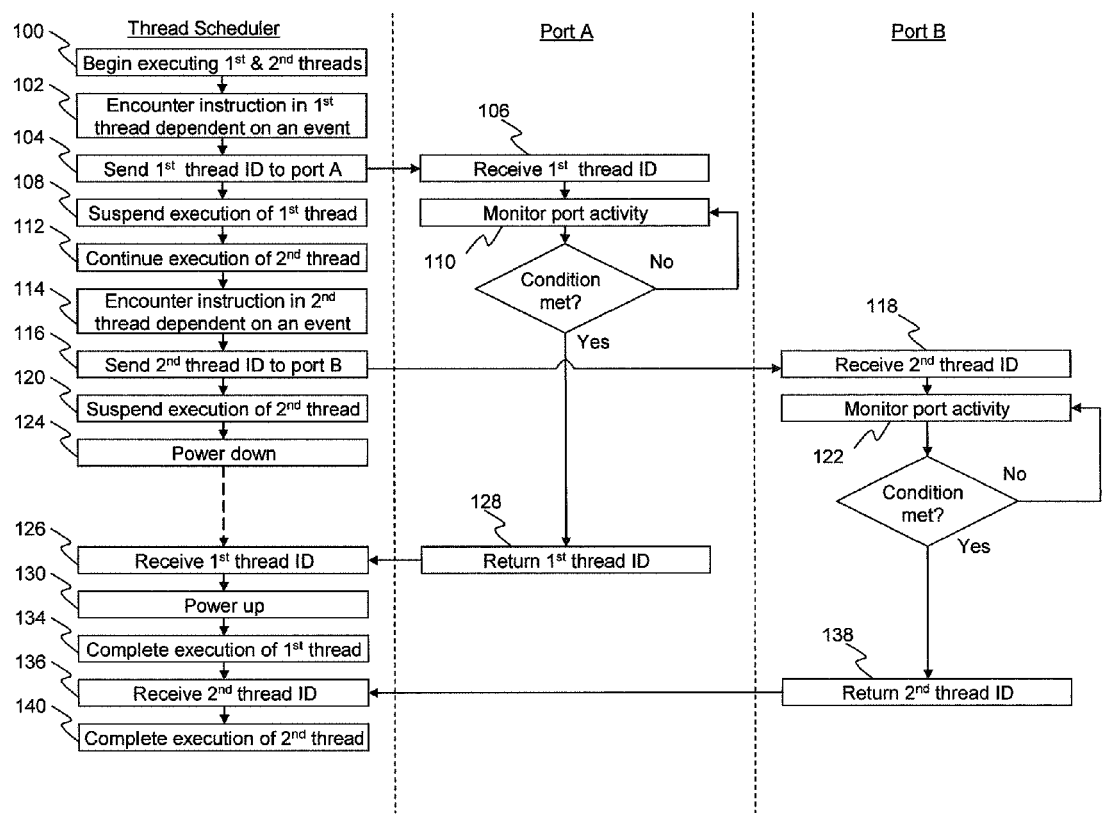
FIG. 6 is a flow diagram illustrating the operation of the thread scheduler.

The operation of the thread scheduler 18 in relation to the ports is discussed below with regard to FIGS. 4 and 6. Direct hardwired paths 30a, 30b, 30c are also provided between the thread scheduler 18 and each of the ports 22; and direct hardwired paths $29_1 \ldots 29_m$ are provided between the thread scheduler 18 and each of the registers 20. These direct paths preferably provide control paths which allow the thread scheduler to associate a respective thread with one or more of the ports 22, and particularly to return ready indications from the ports when certain activity occurs, allowing the processor to respond quickly to activity or stimuli occurring at the ports 22.

The execution unit 16 also has access to each of the ports 22a-22c and each of the registers $20_1$-$20_m$ via direct connections 27 and 31, thus providing a direct link between the core processor, registers, and the external environment. Preferably, these direct paths provide further control paths allowing the execution unit to pass conditions to the ports. This is discussed in further detail below with regard to FIG. 4. The direct paths 27 and 31 may also allow data to be input and output directly between the thread registers 20 and the ports 22, thus allowing threads to communicate directly with the external environment. For example, data may be written directly from an external device to one of a thread's operand registers, rather than being written to memory 24 and then subsequently fetched. Conversely, following an operation, data from an operand register may be picked up by the execution unit 16 and sent directly out of a port 22. This improves reaction time significantly.

Note that by "direct connection" or "direct path" it is meant a connection separate from the connection between the execution unit and the program memory 24. Thus, for example, the thread scheduler 18 and execution unit 16 have access to data input from ports 22 without that data being stored and then subsequently fetched from memory 24. Particularly, if the connection between the execution unit 16 and memory 24 is via a bus 13, then a "direct" connection or path means one which is separate from the bus. Thus the various communications between ports 22, registers 20, thread scheduler 18 and execution unit 16 can all occur without the need for bus arbitration, improving reaction time. The ports 22 may also be provided with an additional connection (not shown) with the bus 13.

The term "port" as used in this application can refer to either a "pin port" or a "data port". A pin port is responsible for detecting individual logical transitions, i.e. rising and falling edges, of a signal occurring at a pin at the processor chip's physical boundary. Data ports are "higher level" in that they can handle one or more bits, typically accumulated in an I/O buffer, and typically making up a portion of data such as a word. Instead of detecting rising and falling edges, a data port handles the state or logic level of a bit or bits at a particular instant. A data port may be on/off chip, or it may be a port to another processor embedded on the same chip. Note that "pin port" and "data port" may in fact refer to different modes of the same actual port.

Figure 4:
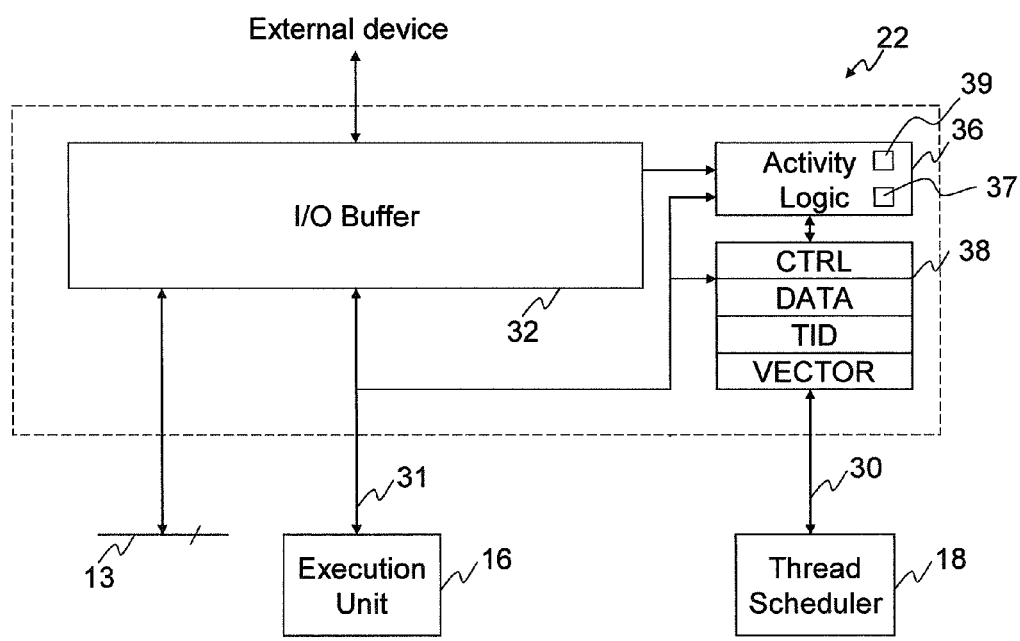
FIG. 4 is a schematic representation of a port.

FIG. 4 shows schematically a port 22 according to a preferred embodiment of the invention. The port 22 comprises an I/O buffer 32 for passing input and output data to and from the processor 14. In addition, each port 22 comprises activity handling logic 36 for monitoring activity occurring at the port and signalling the occurrence of certain activity by means of the ready bit or flag 37. The ready flag 37 is preferably signaled to the thread scheduler via direct path 30. There may be more than one ready flag. Potential activity which the port may detect includes:

data has been input to the port,
some specific data has been input to the port, and/or
the port has become available for output.

To facilitate the detection of such activity, the port 22 is provided with a set of registers 38. These comprises a thread identifier (TID) register for storing an identification of the relevant thread, a control (CTRL) register for storing one or more conditions, a continuation point vector (VECTOR) register for storing the position in the program where execution was suspended, and a data (DATA) register for storing any data associated with a condition. The values TID is written to the registers 38 by the thread scheduler 18 via the direct path 30 (which would be 30a, 30b, 30c in FIG. 3), and the values VECTOR, CTRL and DATA are written by the execution unit 16 via the direct path 31. The TID is returned to the thread scheduler 18 upon detection of the desired activity in order to identify the associated thread. The activity logic also comprises an enable flag 39, which is discussed in further detail below.

Note that although the registers 38 are shown in FIG. 4 as being contained within the port 22, they may in fact be situated elsewhere within the processor 14 and simply associated with the port 22.

Figure 5:
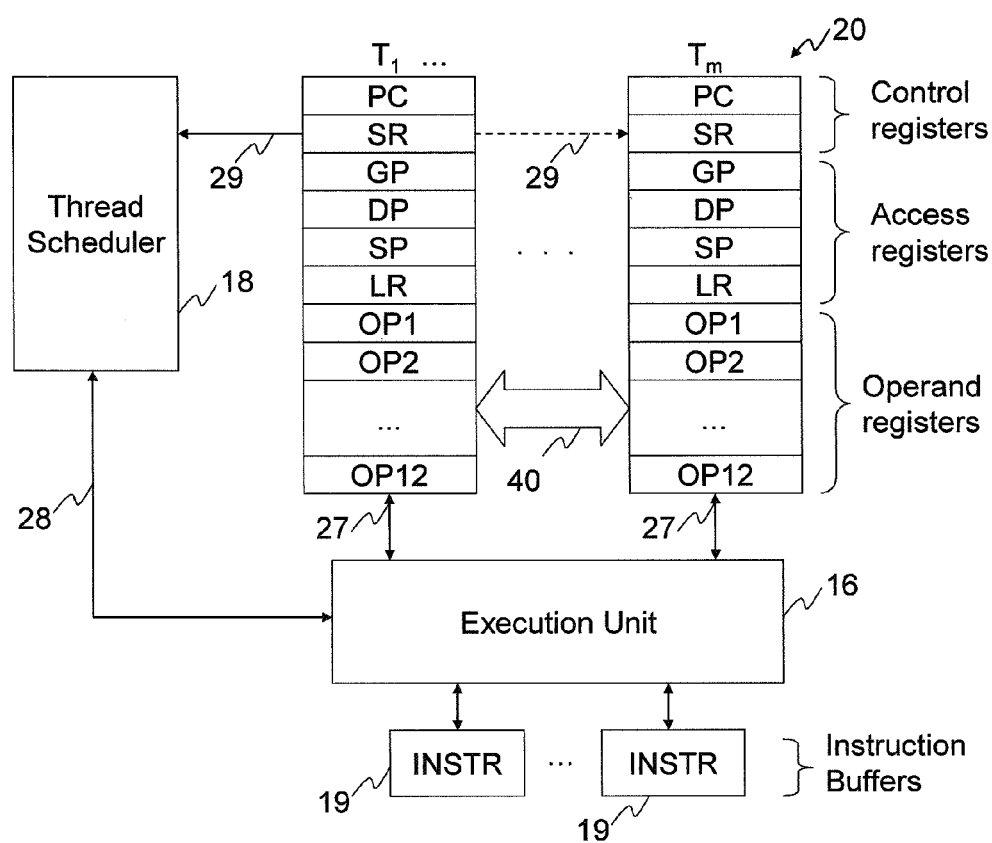
FIG. 5 is a schematic representation of thread register sets.

FIG. 5 shows an exemplary bank of thread registers 20 used to represent the threads. The bank 20 comprises a plurality of sets of registers corresponding to respective threads $T_1$ to $T_m$ which are currently under consideration by the thread scheduler 16. In this preferred example, the state of each thread is represented by eighteen registers: two control registers, four access and twelve operand registers. These are as follows.

Control registers:
PC is the program counter
SR is the status register
Access registers:
GP is the global pool pointer
DP is the data pointer
SP is the stack pointer
LR is the link register
Operand registers: OP1 ... P12

The control registers store information on the status of the thread and for use in controlling execution of the thread. Particularly, the ability of a thread to accept events or interrupts is controlled by information held in the thread status register SR. The thread scheduler 18 has access to at least the status register SR for each thread. The access registers include a stack pointer used for local variables of procedures, a data pointer normally used for data shared between procedures and a constant pool pointer used to access large constants and procedure entry points. The operand registers OP1 ... OP12 are used by instructions which perform arithmetic and logical operations, access data structures, and call subroutines.

As mentioned above, the term "event" as used herein refers to a particular type of operation, or to the activity corresponding to that particular type of operation. Event based operations are slightly different from basic input-output operations, and work as follows. An event is first set for a thread by transferring a continuation point vector from the execution unit 16 and a thread identifier from the thread scheduler 18 to the VECTOR and TID registers 38 associated with a port 22, preferably via direct paths 31 and 30. An associated condition and condition data may also be written to the CTRL and DATA registers 38 of the port 22. The event is thus set at the port, but not necessarily enabled. To enable the port to generate an indication of an event, the port's enable flag 39 must also be asserted, preferably by the thread scheduler 18 via direct path 30. Further, to enable the thread itself to accept events, the thread's event enable (EE) flag in the respective status register SR for the thread must be set to event-enabled. Once the event is thus set and enabled, the thread can be suspended awaiting the event using an event-based wait instruction which acts on the thread scheduler 18. At this point, the current pending instruction may be discarded from the relevant instruction buffer 19. When the event occurs, e.g. some data is input to the port, the occurrence is signaled by the return of the thread identifier and continuation point vector from the port 22 to the thread scheduler 18 and execution unit 16, allowing the instruction at the continuation point vector to be fetched from program memory 24 into an instruction buffer 19 and execution resumed at the appropriate point in the code.

When the event occurs, the thread's EE flag in the respective status register SR may be set to event-disabled to prevent the thread from reacting to events immediately after the occurs. The enable flag 39 may be de-asserted as a result of the thread executing instructions when the event occurs.

The enable flag 39 can be asserted whilst setting up a number of ports in preparation for waiting for an event from one or more of the ports. The thread's EE flag may also be set to event-enabled prior to enabling a set of port enable flags and in this case the first port to be enabled which is ready will generate and event causing the current instruction to be discarded and execution to proceed by immediately fetching and executing the instruction at the continuation point vector.

The advantage of the port's enabling flag 39 and status register EE flag is that the enabling and disabling of events is separated from both the setting up of the events and the suspension of a thread by a wait instruction, allowing different input and output conditions to be readily toggled on and off for a particular thread and/or for various different threads. For example, an event may be left set up at a port 22 even though the event is disabled. Thus events may be re-used by a thread because, although the event has already occurred once, the thread identifier, continuation point vector and condition are still stored in the TID, VECTOR, CTRL and DATA registers 38 of the port 22. So if the thread needs to re-use the event, the port's registers 38 do not need to be re-written, but instead the port's enable flag 39 can simply be re-asserted and/or the EE flag in the status register SR for a thread can be re-set to event-enabled. A further wait instruction will then suspend the thread pending a re-occurrence of the same event.

Furthermore, the use of continuation point vectors allows multiple events to be enabled per thread. That is, a given thread can set up one event at one port 22a by transferring a continuation point vector to that port, set up another event at another port 22b by transferring a different continuation point vector to that other port, and so forth. The thread can also enable and disable the various events individually by separately asserting or de-asserting the different enable flags 39 for each respective port. A wait instruction will then cause the thread to be suspended awaiting any enabled event.

Although events and interrupts are slightly different from basic input and output, the same ready flag system can be used, the result of which can be to make the thread runnable with an empty instruction buffer. To handle the situation, a "fetch vector" request is issued to access the port which generated an event (or interrupt) using the thread identifier. The port can then supply the appropriate vector in time for it to be used for instruction fetch during the memory access stage to which the "fetch vector" request pauses. There may be two or more ports able to supply vectors, in which case a simple priority scheme can be used to select one. This means that at most one virtual cycle is used to process the vector so there will be at most two virtual cycles before instruction issue following an event (or interrupt). It is clear here that also for interrupts a vector can be supplied in this way.

In contrast with events, using basic I/O operations the thread scheduler 18 does not transmit a continuation point vector to the VECTOR register, and does not use the port's enable flag 39 or the EE flag in the status register SR. Instead, the pending instruction is simply left in an instruction buffer 19, and if necessary execution is simply paused pending either an input or the availability of the port for output, as indicated by the ready flag 37. In embodiments, only the TID register may be required for scheduling according to a basic I/O. A basic I/O may or may not use a condition in the CTRL and DATA registers. If such a condition is not used, the I/O will simply be completed as soon as the port is ready.

Note also that once execution of a thread is resumed following an event, it may of course subsequently perform a basic I/O operation. Conversely, once a thread is resumed following a basic I/O, it may subsequently include an event operation. Any such chain of events and I/Os may be included in a thread. For example, a basic I/O operation may be interleaved between two event-based wait operations while the event is disabled (i.e. while the port's enable flag 39 and/or the status register's EE flag is de-asserted) but while the event vector and condition are still left set in the registers 38. That is, the event may be disabled following completion of a first event-based wait operation, a basic I/O subsequently performed using the same port, and then the same event re-enabled for use in a second event-based wait operation. As discussed above, the basic I/O operation pauses and un-pauses the thread but does not effect the port's enable flag 39 or the EE flag in the status register, nor transfer control to the event vector.

The operation of the thread scheduler and two exemplary ports is now described with reference to the flow diagram of FIG. 6. In step 100 the execution unit 16 begins execution of a first and a second thread under the direction of the thread scheduler 18. At step 102 the thread scheduler encounters a portion of code within the first thread which is conditional on an event, for example the receipt of some particular signal at the port 22a. At step 104, the thread scheduler sends the thread identifier (TID) of the first thread to the Port 22a, along with a continuation point vector (VECTOR) specifying at what point in the program thread execution should be continued once the event is detected, and also any required condition control information (CTRL) and associated data (DATA). For example, the data may be the value of the signal which the instruction is expecting to receive at the port. At step 104, the thread scheduler may also set the enable flag 39 of the first port and set the status register SR of the first thread to event-enabled.

At step 106 the port 22a receives this information from the thread scheduler 18. At step 108 the thread scheduler 18 suspends execution of the first thread. At step 110 the port 22a begins to monitor the activity at that port.

At step 112 the thread scheduler 18 determines that the second thread is still outstanding and the execution unit 16 continues execution of the second thread under the direction of the thread scheduler 18. In step 114 the thread scheduler 18 encounters a portion of code which is conditional on an event. At step 116 the thread scheduler 18 sends the thread identifier, along with the continuation point vector and any other required condition information, to the port 22b. At step 116, the thread scheduler may also set the enable flag 39 of the second port and set the second status register for the second thread to event-enabled. At step 118 the port 22b receives this information. At step 120 the thread scheduler suspends execution of the second thread. At step 122 the port 22b begins to monitor the activity occurring at that port.

At step 124 the thread scheduler determines that there are currently no more outstanding threads to be scheduled and the system powers down all components except for the ports 22a and 22b. At step 128 the port 22a detects the relevant event, for example the receipt of the signal stored in the DATA register, and consequently returns the thread identifier (TID) and continuation point vector (VECTOR) (as well as setting the status register of the first thread to event-disabled). At step 126 the thread scheduler 18 receives the returned identifier. Now that execution can continue, at step 130 the system powers up again. At step 134 the execution unit 16 completes the execution of the first thread under the direction of the thread scheduler 18. At step 138 the port 22b detects the relevant event for the second thread and returns its thread identifier and continuation point vector (as well as setting the status register of the second thread to event-disabled). At step 136 the thread scheduler 18 receives the returned information, and at step 138 the execution unit 16 completes the execution of the second thread under the control of the thread scheduler 18. Note that there could be an additional powering down step between steps 134 and 136.

Figure 7:
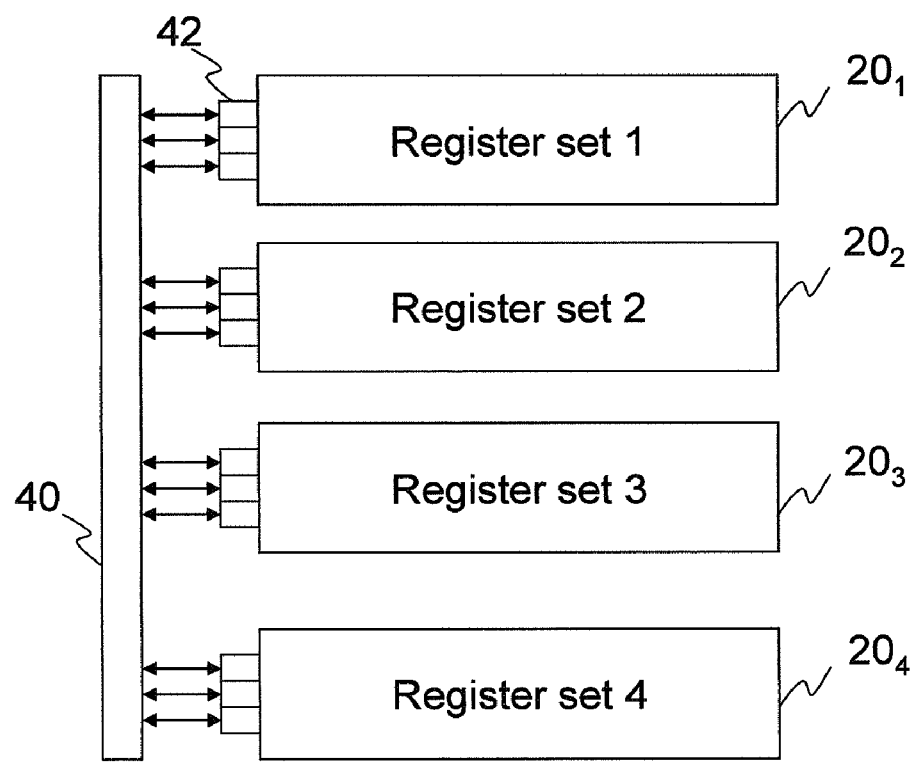
FIG. 7 is a schematic representation of channels between thread register sets.

As illustrated in FIG. 7, the principle of the invention can also be extended to communication between threads, or more accurately between the thread register sets which store information representing the threads. For illustrative purposes, only four thread register sets $20_1$ to $20_4$ are shown in FIG. 7, each storing information for a respective thread $T_1$ to $T_4$. Each of the thread register sets is connected to each of the other sets by an interconnect system 40, which is operable to establish at least one channel for transferring data directly between at least two of the thread register sets 20. Channels are preferably used to transfer data to and from the operand registers OP, but could in principle be used to transfer information to or from other types of register such as a status register SR. The thread scheduler 18 can schedule threads based on activity occurring over channels in a similar manner as discussed in relation to ports above.

Figure 7A:
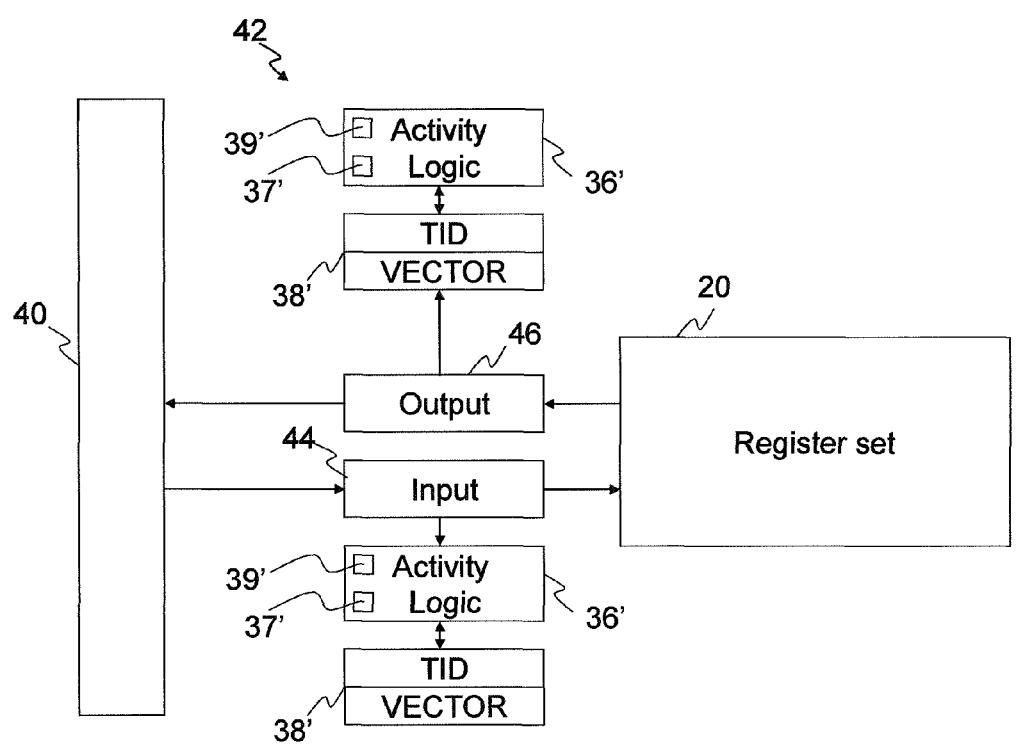
FIG. 7A is a schematic representation of a channel end.

As shown in FIG. 7A, each of the channel ends 42 resembles a pair of ports, with an input buffer 44 and an output buffer 46. Similarly to the ports 22, each channel input buffer 44 and output buffer 46 may have activity handling logic 36' for monitoring activity occurring over a channel and signalling the occurrence of certain activity by means of at least one ready flag 37'. Potential activity which the channel end may detect includes: that data has been input to the channel, or that the channel has become available for output. If an output instruction is executed when the channel is too full to take the data then the thread which executed the instruction is paused, and is restarted when there is enough room in the channel for the instruction to successfully complete. Likewise, when an instruction is executed and there is not enough data available then the thread is paused, and will be restarted when enough data becomes available.

Again as with the ports 22, in order to facilitate the detection of such activity, each channel end is associated with registers 38'. These comprise a thread identifier (TID) register for storing an identification of the relevant thread, and a continuation point vector (VECTOR) register for storing the position in the program where execution should resume upon occurrence of an event. These TID and VECTOR registers can then be used by the thread scheduler 18 and execution unit 16 to schedule threads in the same manner as with the ports 22. The VECTOR register allows the channel to generate events and interrupts. The channel end also has an enable flag 39' to enable the channel to generate events. In embodiments, the channel ends 42 may not be provided with CTRL and DATA registers.

The same channel ends 42 may also be used to communicate data from the thread registers to the external environment via the ports 22. That is, the execution unit 16 may pick up the contents of a register 20 via a channel end 42 and pass it directly out via a port 22; and conversely, the execution unit 16 may also receive input from a port 22 and transfer it directly to a register 20 via a channel end 42. Thus if two or more interface processors according to the present invention are connected together, as shown for example in FIG. 2A, a channel can also be established between those processors. Within an inter-processor system, each processor may interface with a system interconnect via a number of bidirectional physical links 204 which allow simultaneous connection with other processors.

The general term used herein to cover ports, channels, and other sources of activity is "resource".

The interface processor can support several programming approaches due to its thread-based structure. It can be treated as a single conventional processor performing standard input and output, or it can be programmed as part of a parallel array of hundreds of communicating components. An instruction set is provided which supports these options. The instruction set includes special instructions which support initialisation, termination, starting and stopping threads and provide input/output communication. The input and output instructions allow very fast communications with external devices. They support high-speed, low-latency input and output and high-level concurrent programming techniques. Their application therein to handling port activity is discussed more fully in the following, which describes example instructions that can be used to implement the present invention.

Resources are firstly reserved for a thread using a GETR instruction specifying the type of resource required, and can be freed again using a FREER instruction.

Ports can be used in input or output mode. In input mode a condition can be used to filter the data passed to the thread. A port can be used to generate events or interrupts when data becomes available as described below. This allows a thread to monitor several ports, only servicing those that are ready. Input and output instructions, IN and OUT, can then be used to transfer of data to and from ports once ready. In this case, the IN instruction inputs and zero-extends the n least significant bits from an n-bit port and the OUT instructions outputs the n least significant bits.

Two further instructions, INSHR and OUTSHR, optimise the transfer of data. The INSHR instruction shifts the contents of a register right by n bits, filling the left-most n bits with the data input from the n-bit port. The OUTSHR instruction outputs the n least significant bits of data to the n-bit port and shifts the contents of a register right by n bits.

| | | |
|---|---|---|
| OUTSHR port, s | port ◁ s[bits 0 for width(port)];<br>s ← s >> width(port) | output from port and shift |
| INSHR port, s | s ← s >> width(d);<br>port ▷ s[bits (bitsperword − width(d))<br>for width(d)] | shift and input from port | where the "▷" represents an input and the "◁" represents an output.

A port must be configured before it can be used. It is configured using the SETC instruction which is used to define several independent settings of the port. Each of these has a default mode and need only be configured if a different mode is needed.

SETC port, mode port[ctrl]←mode set port control

The effect of the SETC mode settings is described below. The first entry in each setting is the default mode.

| Mode | Effect |
|---|---|
| OFF | port not active; pin(s) high impedance |
| ON | active |
| IN | port is an input |
| OUT | port is an output (but inputs return the current pin value) |
| EVENT | port will cause events |
| INTERRUPT | port will raise interrupts |

-continued

| Mode | Effect |
|---|---|
| DRIVE | pins are driven both high and low |
| PULLDOWN | pins pull down for 0 bits, are high impedance otherwise |
| PULLUP | pins pull up for 1 bits, but are high impedance otherwise |
| UNCOND | port always ready; inputs complete immediately |
| EQUAL | port ready when its value is equal to its DATA value |
| NE | port ready when its value is different from its DATA value |
| TRANSITION | port ready when its value changes towards its DATA value |
| GR | port ready when its value is greater than its DATA value |
| LS | port ready when its value is less than its DATA value |

The DRIVE, PULLDOWN and PULLUP modes are only relevant when the port direction is OUT. The TRANSITION condition is only relevant for 1-bit ports and the GR and LS conditions are only relevant for ports with more than one bit.

Each port has a ready bit 37 which is used to control the flow of data through the port, and defines Whether the port is able to complete input or output instructions. The ready bit is set in different ways depending on the port configuration. The ready bit is cleared when any of the SETC, SETD or SETV instructions are executed.

A port in input mode can be configured to perform conditional input. The condition filters the input data so that only data which meets the condition is returned to the program. When a condition is set, the IN and INSHR instructions will only complete when the port is ready. As described above, executing an input instruction on a port which is not ready will pause the thread. When ready, the port sets its ready bit which is signaled to the thread scheduler. The thread resumes and re-executes the input instruction. This time the port is ready, the data is returned and the ready bit 37 is cleared.

Once a port ready bit is set, the data value which satisfied the condition is captured so that the software gets the value which met the condition even if the value on the port has subsequently changed. When an IN or INSHR instruction is executed and the ready bit is set then the data is returned and the ready bit cleared. If the ready bit is not set then the thread is paused until the ready bit is set. If a condition is set then the data is compared against the condition and the ready bit is only set when the condition is met.

When the OUT or OUTSHR instruction is executed if the ready bit is clear then the data is taken by the port and the ready bit is set. If the ready bit is set then the thread is paused until it is cleared by the port.

In order to communicate between two threads, two channel ends need to be allocated, one for each thread. This is done using a GETR CHAN instruction. The two threads can then use the resource identifiers to transfer a data word using output and input instructions:

OUT d◁s
IN d▷s

If an output instruction is executed when the channel is too full to take the data then the thread which executed the instruction is paused. It is restarted when there is enough room in the channel for the instruction to successfully complete. Likewise, when an input instruction is executed and there is enough data available then the thread is paused and will be restarted when enough data becomes available. When it is no longer required, the channel can be freed using a FREER CHAN instruction. Otherwise it can be used for another message.

Events and interrupts allow resources (ports and channels) to automatically transfer control to a predefined event handler. The ability of a thread to accept events or interrupts is controlled by information held in the thread status register SR (see FIG. 4), and may be explicitly controlled using TSE and TSD instructions. This information comprises an event enable flag (EE) and an interrupt enable flag (IE).

| TSE s | SR ← SR ∨ s | thread state enable |
| TSD s | SR ← SR ∧ ¬ s | thread state disable |

The operand of these instructions should be one of:

| EE | to enable or disable events |
| IE | to enable or disable interrupts |

Events are handled in the same scope in which they were set up. Hence, on an event all the thread's state is valid, allowing the thread to respond rapidly to the event. The thread can perform input and output operations using the port which gave rise to an event whilst leaving some or all of the event information unchanged. This allows the thread to complete handling an event and immediately wait for another similar event.

The program location of the event handler must be set prior to enabling the event using the SETV instruction. Ports have conditions which determine when they will generate an event; these are set using the SETC and SETD instructions. Channels are considered ready as soon as they contain enough data or have room to accept data for output.

Event generation by a specific port or channel can be enabled using an event enable unconditional (EEU) instruction and disabled using an event disable unconditional (EDU) instruction. The event enable true (EET) instruction enables the event if its condition operand is true and disables it otherwise; conversely the event enable false (EEF) instruction enables the event if its condition operand is false, and disabled it otherwise. These instructions are used to optimise the implementation of guarded inputs. Below are some example instruction formats for configuring events on ports, but it will be understood that the same instructions can apply in relation to channels.

| SETV port, v | port[vector] ← v | set event vector |
| SETD port, d | port[data] ← d | set event data |
| SETC port, c | port[ctrl] ← c | set event control |
| EET port, b | port[enable]← b; port[ tid ] ← thread | event enable true |
| EEF port, b | port[enable]← ¬b; port[ tid ] ← thread | eventenable false |
| EDU port | port[enable]← false; port[ tid ] ← thread | event disable |
| EEU port | port[enable]← true; port[ tid ] ← thread | event enable |

Having enabled events on one or more resources, a thread can use a WAITEU instruction to wait for at least one event. This may result in an event taking place immediately with control being transferred to the event handler specified by the corresponding event vector with events disabled by clearing the EE (event enable) flag. Alternatively the thread may be suspended until an event takes place—in this case the EE flag will be cleared when the event takes place, and the thread resumes execution.

| WAITET b | if b then SR[EE] ← true | event wait if true |
| WAITEF b | if ¬b then SR[EE] ← true | event wait if false |
| WAITEU | SR[EE] ← true | event wait |
| CLRE | SR[EE] ← false; forall port if port[tid] = thread then port[enable] ← false | disable all events for thread |

To optimise the common case of repeatedly waiting for one or more events until a condition occurs, conditional forms of the event wait instruction are provided. The WAITET instruction waits only if its condition operand is true, and the WAITEF waits only if its condition operand is false.

All of the events which have been enabled by a thread can be disabled using a single CLRE instruction. This disables event generation in all of the ports which have had events enabled by the thread. The CLRE instruction also clears the event-enabled status in the thread's status register.

In order to optimise the responsiveness of a thread to high priority resources, the TSE EE instruction can be used to enable events on a thread first before subsequently starting to enable the ports and/or channels and using one of the event wait instructions. This way, the processor can scan through the resources in priority order. This may cause an event to be handled immediately as soon as it is enabled.

In contrast to events, interrupts are not handled within the current scope and so the current PC and SR (and potentially also some or all of the other registers) must be saved prior to execution of the interrupt handler. On an interrupt generated by resource r the following occurs automatically:
SAVEPC←PC;
SAVESR←SR;
SR[EE]←false;
SR[IE]←false;
PC←r[vector]

When the handler has completed, execution of the interrupted thread can be performed by an RFINT instruction.

| RFINT | PC ← SAVEPC; SR ←SAVESR | return from interrupt |

An interrupt could interrupt a thread whilst suspended awaiting an event.

The following are examples of instructions that can be used with the thread scheduling arrangement described above. The abbreviation "reg" as used below refers to a register, "op reg" to an operand register, "imm" to an immediate operand, and "dest" to a destination operand register.

| ADDI dest, source, constant | add source to constant (two op regs & 4-bit imm) |
| MUL dest, source1, source2 | multiply source1 by source2 (three op regs) |
| LSU dest, source1, source2 | less than unsigned (three op regs) |
| STW data, base offset | store data to memory (three op regs) |
| LDW data, base, offset | load data from memory (three op regs) |
| LDWSP data, offset | load data from stack (any reg & 6-bit imm) |
| LDC data, constant | load constant (any reg & 6-bit imm) |
| STB data, addr | store byte to memory (two op regs) |
| BRFT flag, offset | branch forward if flag true (op reg & 6-bit imm) |
| BRBF flag, offset | branch forward if flag false (op reg & bit-bit imm) |
| BRFU offset | branch relative forward unconditional (6-bit imm) |

-continued

| | |
|---|---|
| BLRF offset | branch and link relative forward (10-bit imm subroutine call) |
| GETR resource, type | allocate resource to a thread (two op-regs) |
| IN resource, data | input (two op regs) |
| OUT resource, data | output (two op regs) |
| INSHR resource, data | input and shift right (two op regs) |
| NOT dest, source | bitwise not (two op regs) |
| EET flag, resource | enable event if flag true (two op regs) |
| EEU resource | enable event unconditional (one op reg) |
| WAITEU | wait event unconditional (no operand) |
| CLRE | clear events for a thread (no operand) |

Here are a few example of use of the above instructions. The first example performs a multiply-accumulate of two arrays a and b:
MACC:
LDW x, a, i
LSU go, i, limit
LDW y, b, i
ADDi, i, 1
MUL prod, x, y
ADD sum, sum, prod
BRBF go, MACC The next two perform the same input and output functions as would normally be performed by a DMA (direct memory access) controller. They transfer a block of words using channel c starting at address base in memory:
DMAI:
LSU go, i. limit
IN c, x
STW x, base, i
ADDI i, i, 1
BRBF go, DMAI
DMAO:
LDW x, base, i
LSU go, i, limit
ADDI i, i, 1
OUT c, x
BRBF go DMAO It will be appreciated that the above embodiments are described only by way of example. In other embodiments, different sets of registers and instructions may be provided depending on the desired specifications of the chip. In some embodiments, thread identifiers need not be transmitted to ports but could remain the responsibility of the thread scheduler, or be stored elsewhere. Alternatively, each thread could be given an individual ready flag at the port, such that the thread identifier is passed to the port to select the correct ready signal but the thread identifier need not be returned to the thread scheduler upon detection of the activity. Further, conditions and/or condition data need not be transmitted to ports. Instead conditions could be preconfigured at ports and/or conditions could be evaluated at the thread scheduler or elsewhere. Threads may be scheduled based on activity from other sources other than ports and channels. Different interconnects may be provided between the various components of the processor. Also, the invention is not specific to use in a mobile terminal with a mobile applications processor. Other applications and configurations will be apparent to the person skilled in the art. The scope of the invention is not limited by the described embodiments, but only be the following claims.

The invention claimed is:

1. A processor for executing threads, each thread comprising a sequence of instructions, said instructions defining operations and at least some of said instructions defining a memory access operation, comprising:

a plurality of instruction buffers, each for holding at least one instruction of a thread associated with that buffer;

an instruction issue stage for issuing instructions from the instruction buffers; and a memory access stage connected to a memory and arranged to receive instructions issued by the instruction issue stage, said memory access stage comprising:

(1) detecting logic adapted to detect whether a memory access operation is defined in each of said instructions issued by the instruction issue stage, and (2) instruction fetch logic adapted to instigate an instruction fetch to fetch an instruction of a thread when no memory access operation is detected in one of said instructions issued by the instruction issue stage.

2. A processor according to claim 1, comprising means arranged to provide an address at the memory access stage for effecting the instruction fetch operation for instructions which do not define a memory access operation.

3. A processor according to claim 1, comprising means associated with each thread to indicate a runnable status for the thread.

4. A processor according to claim 3, wherein the instruction issue stage is arranged to issue instructions from the instruction buffers by taking in turn one instruction from each buffer associated with a runnable thread.

5. A processor according to claim 1, comprising means for loading the fetched instruction into the instruction buffer of a thread.

6. A processor according to claim 5, wherein the fetched instruction is for the thread of which the instruction instigated the instruction fetch operation.

7. A processor according to claim 5, wherein the fetched instruction is for a thread different from the thread of which the instruction instigated the instruction fetch operation.

8. A processor according to claim 1, wherein the instruction issue stage is arranged to issue a fetch request in the event that the instruction buffer of a thread for which an instruction should next be issued is empty, said fetch request instigating an instruction fetch operation to fetch an instruction at the memory access stage.

9. A processor according to claim 1, wherein the instruction issue stage is arranged to issue a fetch vector request in the event that the instruction buffer of a thread for which an instruction should next be issued is empty for the reason that the thread awaits a vector from a resource, wherein the fetch vector request fetches the vector from the resource and instigates a memory access operation at the memory access stage using the vector to provide an address.

10. A processor according to claim 1, further comprising a thread scheduler arranged to schedule multiple threads for execution based on indications of specific activities associated with the threads.

11. A processor according to claim 10, comprising a plurality of sets of thread registers, each set of thread registers being allocated to store information relating to a respective one of said multiple threads.

12. A processor according to claim 11, comprising a read register stage at which instructions access said thread registers.

13. A processor according to claim 2, wherein said means arranged to provide an address comprises a program counter.

14. A processor according to claim 2, wherein said means arranged to provide an address comprises logic adapted to calculate said address from a program counter and the number of instructions remaining in an instruction buffer of a thread for which the instruction is to be fetched.

15. A mobile terminal comprising a processor for executing threads, each thread comprising a sequence of instructions, said instructions defining operations and at least some of said instructions defining a memory access operation, comprising:
- a plurality of instruction buffers, each for holding at least one instruction of a thread associated with that buffer;
- an instruction issue stage for issuing instructions from the instruction buffers; and
- a memory access stage connected to a memory and arranged to receive instructions issued by the instruction issue stage,
- said memory access stage comprising:
  - (1) detecting logic adapted to detect whether a memory access operation is defined in each of said instructions issued by the instruction issue stage, and
  - (2) instruction fetch logic adapted to instigate an instruction fetch to fetch an instruction of a thread when no memory access operation is detected in one of said instructions issued by the instruction issue stage.

16. An array of processors, each processor comprising a processor for executing threads, each thread comprising a sequence of instructions, said instructions defining operations and at least some of said instructions defining a memory access operation, comprising:
- a plurality of instruction buffers, each for holding at least one instruction of a thread associated with that buffer;
- an instruction issue stage for issuing instructions from the instruction buffers; and
- a memory access stage connected to a memory and arranged to receive instructions issued by the instruction issue stage, said memory access stage comprising:
  - (1) detecting logic adapted to detect whether a memory access operation is defined in each of said instructions issued by the instruction issue stage, and
  - (2) instruction fetch logic adapted to instigate an instruction fetch to fetch an instruction of a thread when no memory access operation is detected in one of said instructions issued by the instruction issue stage.

17. A method of executing threads, each thread comprising a sequence of instructions, said instructions defining operations and at least some of said instructions defining a memory access operation, the method comprising:
- holding at least one instruction of a thread in an instruction buffer for that thread;
- issuing instructions from the instruction buffers to an instruction issue stage of an execution pipeline;
- receiving instructions issued by the instruction issue stage at a memory access stage connected to a memory; and
- detecting whether a memory access operation is defined in each of said instructions issued by the instruction issue stage, and, when it is not detected in one of said instructions issued by the instruction issue stage, using the memory access stage to instigate an instruction fetch operation to fetch an instruction of a thread.

18. A method according to claim 17, including the step of providing an address to the memory access stage for effecting the instruction fetch operation for instructions which do not define a memory access operation.

19. A method according to claim 18, wherein the step of providing the address comprises supplying a program count to the memory access stage.

20. A method according to claim 18, wherein the step of providing an address comprises generating an address based on a program count and the number of instructions remaining in an instruction buffer of a thread for which the instruction is fetched.

21. A method according to claim 17, in which said instructions include a type of branch instruction which defines a memory access operation which causes an instruction to be fetched.

22. A method according to claim 18, wherein said instructions include a type of branch instruction which define a memory access operation for retrieving a branch target from said memory, said target being the address provided to the memory access stage.

23. A method according to claim 17, wherein instructions are issued from the instruction buffers by taking in turn one instruction from each buffer associated with a runnable thread.

24. A method according to claim 17, comprising the step of loading the fetched instruction into the instruction buffer of a thread.

25. A method according to claim 17, comprising the step of loading the instruction into the instruction buffer of the thread which instigated the instruction fetch operation.

26. A method according to claim 17, comprising the step of loading the fetched instruction into the instruction buffer of a thread different from the one which instigated the instruction fetch operation.

27. A method according to claim 15, comprising the step of issuing a fetch request in the event that the instruction buffer of a thread for which an instruction should next be issued is empty, said fetch request instigating a instruction fetch operation to fetch an instruction at the memory access stage.

28. A method according to claim 15, comprising the step of issuing a fetch vector request in the event that instruction buffer of a thread for which an instruction should next be issued is empty for the reason that the thread awaits a vector from a resource, wherein the fetch vector request fetches the vector from the resource and instigates a memory access operation at the memory access stage using the vector.

29. A processor for executing threads, each thread comprising a sequence of instructions, said instructions defining operations and at least some of said instructions defining a memory access operation, comprising:
- buffer means for holding instructions of threads;
- instruction issue means for issuing instructions from the buffer means; and
- memory access means connected to a memory and arranged to receive instructions issued by the instruction issue means, said memory access means comprising:
  - (1) means for detecting whether a memory access operation is defined in each of said instructions issued by said instruction issue means, and
  - (2) means for instigating an instruction fetch to fetch an instruction of a thread when no memory access operation is detected in one of said instructions issued by the instruction issue means.

30. A processor according to claim 2, comprising means associated with each thread to indicate a runnable status for the thread.

31. A processor according to claim 30, wherein the instruction issue stage is arranged to issue instructions from the instruction buffers by taking in turn one instruction from each buffer associated with a runnable thread.

* * * * *